(12) United States Patent
Lacher et al.

(10) Patent No.: US 10,967,739 B2
(45) Date of Patent: Apr. 6, 2021

(54) METHOD AND SYSTEM FOR CHARGING AN ELECTRIC BICYCLE FROM THE POWER SUPPLY OF A MOTOR VEHICLE

(71) Applicant: AUDI AG, Ingolstadt (DE)

(72) Inventors: Peter Lacher, Gaimersheim (DE); Markus Aunkofer, Abensberg (DE)

(73) Assignee: AUDI AG, Ingolstadt (DE)

( * ) Notice: Subject to any disclaimer, the term of this patent is extended or adjusted under 35 U.S.C. 154(b) by 186 days.

(21) Appl. No.: 16/274,502

(22) Filed: Feb. 13, 2019

(65) Prior Publication Data

US 2019/0255950 A1     Aug. 22, 2019

(30) Foreign Application Priority Data

Feb. 21, 2018   (DE) .................. 10 2018 202 595.9

(51) Int. Cl.
| | | |
|---|---|---|
| *H02J 7/00* | (2006.01) | |
| *B60L 1/00* | (2006.01) | |
| *H04B 5/00* | (2006.01) | |
| *B60Q 5/00* | (2006.01) | |
| *B60L 50/20* | (2019.01) | |

(Continued)

(52) U.S. Cl.
CPC ............. *B60L 1/006* (2013.01); *B60L 50/20* (2019.02); *B60L 53/16* (2019.02); *B60L 53/305* (2019.02); *B60L 53/53* (2019.02); *B60L 53/65* (2019.02); *B60L 53/66* (2019.02); *B60Q 5/005* (2013.01); *H02J 7/0045* (2013.01); *H02J 7/342* (2020.01);

(Continued)

(58) Field of Classification Search
CPC .... B60L 1/006; B60L 2200/46; B60L 53/305; B60L 53/53; B60L 53/66; B60L 53/65; B60L 53/16; B60L 2200/12; H02J 7/342; H02J 7/0045; H04B 5/0031; B60Q 5/005; H01M 10/4257; Y02E 60/10; Y04S 30/14; Y02T 90/12; Y02T 10/7072; Y02T 90/14; Y02T 10/70; Y02T 90/16; Y02T 90/167; B62M 6/80
USPC ................................................ 320/103, 109
See application file for complete search history.

(56) References Cited

U.S. PATENT DOCUMENTS

| | | | |
|---|---|---|---|
| 2012/0146429 A1* | 6/2012 | Seol ......................... | B62M 6/90 307/116 |
| 2016/0031506 A1* | 2/2016 | Lloyd ..................... | B60L 53/68 701/49 |

FOREIGN PATENT DOCUMENTS

| | | |
|---|---|---|
| DE | 10 2010 039 855 A1 | 3/2012 |
| DE | 10 2014 018 111 A1 | 6/2015 |

(Continued)

OTHER PUBLICATIONS

Examination Report dated Sep. 27, 2018 of corresponding German application No. 10 2018 202 595.9; 20 pages.

*Primary Examiner* — Zixuan Zhou
(74) *Attorney, Agent, or Firm* — Maier & Maier, PLLC

(57) ABSTRACT

A method for charging an electric bicycle from the power supply of a motor vehicle. The motor vehicle is coupled via an electrical trailer connection and an electrical adapter to the battery of the electric bicycle. In order to provide anti-theft protection, the motor vehicle sends the battery a query signal relating to identification data of the battery via a communication channel. Subsequently, the motor vehicle listens in on the communication channel upon transmission of the identification data of the battery. For the case in which the motor vehicle receives incorrect identification data or no identification data from the battery, an alarm signal is output.

8 Claims, 2 Drawing Sheets

(51) Int. Cl.
*B60L 53/30* (2019.01)
*B60L 53/53* (2019.01)
*B60L 53/66* (2019.01)
*B60L 53/65* (2019.01)
*B60L 53/16* (2019.01)
*H02J 7/34* (2006.01)
*H01M 10/42* (2006.01)

(52) U.S. Cl.
CPC ........ *H04B 5/0031* (2013.01); *B60L 2200/12* (2013.01); *H01M 10/4257* (2013.01)

(56) References Cited

FOREIGN PATENT DOCUMENTS

| | | |
|---|---|---|
| DE | 10 2015 110 730 A1 | 1/2016 |
| DE | 10 2015 111 978 A1 | 2/2016 |
| DE | 10 2015 011 016 A1 | 3/2016 |
| DE | 10 2015 116 693 A1 | 4/2016 |

* cited by examiner

METHOD AND SYSTEM FOR CHARGING AN ELECTRIC BICYCLE FROM THE POWER SUPPLY OF A MOTOR VEHICLE

FIELD

The present invention relates to a method and to a system for charging an electric bicycle from the power supply of a motor vehicle, comprising the motor vehicle, itself comprising the power supply and an electrical trailer connection coupled to the power supply, wherein the electrical trailer connection comprises at least a positive terminal and a negative terminal, the electric bicycle, itself comprising a battery with a charge connection which comprises at least a positive terminal and a negative terminal, an electrical adapter which can be coupled or is coupled on the input side to the electrical trailer connection of the motor vehicle and which comprises an output connection which comprises at least a positive terminal and a negative terminal, wherein the positive terminal of the output connection can be coupled or is coupled via the electrical adapter to the positive terminal of the electrical trailer connection of the motor vehicle and the negative terminal of the output connection can be connected or is connected via the electrical adapter to the negative terminal of the electrical trailer connection. The invention moreover relates to a battery as well as to a motor vehicle designed for a system according to the invention.

BACKGROUND

A method and a system according to the preamble for charging an electric bicycle from the power supply of a motor vehicle are known from DE 10 2010 039 855 A1. In this published document, a charging device is described, which can comprise components provided for data transmission in order to transmit operating parameters of a charge control into the interior of the vehicle. In particular, these components can be configured to transmit operating data of a voltage converter, of a charge regulator, of a discharge protector, of a surge protector, of a current measuring unit for detecting a charge current and/or of a charge current monitoring device for detecting the charge state of the charge control, for example, the current charge current, charge state, charge run, charge duration, battery voltage or temperature, a warning in the case of operating parameters outside of a normal range or the like.

From DE 10 2015 116 693 A1, a vehicle and electric bicycle charge monitoring interface is known. The subject matter of this published document is a vehicle system comprising the following: a charge interface which is configured to connect a bicycle battery, a processing device which is programmed to determine a charge state of the bicycle battery and to estimate the driving ranges of a vehicle and of a bicycle, and a navigation module programmed to generate a route to a selected target on the basis of the estimated driving ranges of the vehicle and of the bicycle.

SUMMARY

The aim of the present invention consists in developing a method according to the preamble and a system according to the preamble in such a manner that the operating range is broadened by at least one additional functionality.

The present invention is based on the finding that a method according to the preamble or a system according to the preamble can be broadened in a simple manner not only in order to charge electric bicycles from the power supply of a motor vehicle but also to provide anti-theft protection for this electric bicycle.

If a trailer, for example, a mobile home, a standard trailer, a bicycle carrier for a trailer coupling, is connected to a motor vehicle, said trailer is coupled electrically, for example, by means of a 13-pin plug (ECE), to the vehicle electronics, in particular to the power supply of the motor vehicle. Here, there are pins in the plug which conduct the continuous current. As is apparent from the subsequent embodiments, it is known to use the current-carrying pin in order to charge electric bicycles on a bicycle carrier in the mounted state during driving.

A more precise analysis of the DE 10 2010 039 855 A1 already mentioned above leads to the finding that the charge device mentioned therein could in principle also be used for antitheft protection if, when it is established that an operating parameter is outside of a normal range, a warning signal is output instead of a warning. For example, if an attempt is made to measure a battery voltage or temperature, in spite of the electric bicycle having been stolen, then it must be assumed that the battery voltage or the battery temperature is outside of a normal range. However, such a development of the charge device mentioned in DE 10 2010 039 855 A1 could be circumvented easily if, using commercial cable clamps, prior to the removal of the electric bicycle to be protected, a replacement battery were to be connected in parallel to the battery of the electric bicycle. If, after the parallel connection of this replacement battery, the electric bicycle together with the battery is stolen, the charge device measures the operating parameter of this replacement battery, wherein, by an appropriate preparation, it can be ensured without difficulty that said operating parameters are within the relevant normal ranges. Since replacement batteries for electric bicycles are commercially available at low cost, such anti-theft protection can be circumvented in this manner without great effort.

By means of the present invention, on the other hand, an exceedingly reliable anti-theft protection can be provided: the present invention is based on the finding that a replacement of the battery of the electric bicycle is detected if the battery of the electric bicycle is taught on an individualized basis to the motor vehicle. If accordingly the motor vehicle "knows" which specific battery of the electric bicycle is coupled to the power supply of the motor vehicle, then said battery cannot be replaced by another battery or the electric bicycle together with the battery cannot be removed without this being registered in the motor vehicle, so that an alarm signal can be output.

Thus, according to the invention, in a step a) the motor vehicle sends the battery a query signal concerning identification data of the battery via a communication channel. In a step b) the motor vehicle then listens in on the communication channel upon transmission of the identification data of the battery. If, in a subsequent step c), the motor vehicle receives incorrect identification data or no identification data from the battery, an alarm signal is output. In this manner, not only can an electric bicycle be charged from the power supply of a motor vehicle, which is arranged in particular on a trailer or a corresponding holding device of the motor vehicle, but it can also be reliably protected from theft.

The inventive method protects both against a replacement of the electric bicycle together with the battery by a replacement battery and also against just the removal of the electric bicycle together with the battery.

It is only supplementally that reference is made to DE 10 2015 011 016 A1 which, however, neither anticipates nor suggests the present invention. From this published document, a theft warning system for vehicle trailers is known. It comprises a master module which can be connected to a theft warning system of the vehicle by means of a first data communication connection, a slave module which can be connected to the master module by means of a second data communication connection, a sensor system which can be coupled to the slave module for the determination of a state of the trailer, wherein the slave module and/or the master module generate(s) an alarm signal inasmuch as the state corresponds to a predetermined alarm state and/or a data communication connection existing between the slave module and the master module is interrupted. However, this published document relates neither to the charging of an electric bicycle nor to the protection of an electric bicycle against theft.

In the inventive method, step c) preferably comprises the following sub-step c1): if the motor vehicle receives identification data from the battery, this identification data is compared against reference data in the motor vehicle. By means of this comparison, it can be established in a simple manner whether the correct battery is coupled to the power supply of the motor vehicle.

Preferably, the identification data is transmitted on the communication channel in an encrypted manner from the battery to the motor vehicle. This can occur, for example, in the form of a challenge-response method. The identification data itself can be encrypted or alternatively the communication channel can be encrypted. By means of both alternatives, it is ensured that the identification data of the battery cannot be read out or intercepted by unauthorized individuals to be used for abusive purposes, for example, for stealing the electric bicycle.

As communication channel for a communication between the motor vehicle and the battery, in particular for the transmission of the query signal from the motor vehicle to the battery and for the transmission of the identification data from the battery to the motor vehicle, at least one of the following transmission paths is used: a positive line which couples the positive terminal of the battery to the positive terminal of the electrical trailer connection and/or a control line which couples a control terminal of the charge connection of the battery to a control terminal of the electrical trailer connection and/or wireless near-field communication between the battery and the motor vehicle, in particular Bluetooth, WLAN or NFC. Thus, depending on the design, the communication can occur by wired or wireless connection. Corresponding decryption methods that can be used for this purpose are sufficiently known to the relevant person skilled in the art.

Preferably, in step a), after the detection of an electrical coupling of the electric bicycle to the power supply of the motor vehicle, the query signal is sent at predetermined time intervals. The predetermined time interval can be 30 seconds, for example. In this manner, a reliable monitoring of the electric bicycle with low current consumption is possible. If an alarm signal is generated, the thief is still close to the site of the theft and can therefore possibly still be stopped.

According to a preferred development, the motor vehicle is designed to carry out the following steps: e) verification as to whether the coupling of the battery of the electric bicycle to the power supply of the motor vehicle is a first-time coupling of a battery of an electric bicycle to the power supply of the motor vehicle; f), if in step e) a first-time coupling is detected: request for an authorization for the coupling of the battery to the power supply of the motor vehicle; g), if in step f) a successful authorization has taken place: transmission of the identification data of the battery from a memory device of the battery to the motor vehicle; and h) storing of the identification data transmitted in step g) in a memory device of the motor vehicle as reference data. This procedure enables, with particularly low effort, a motor vehicle to be taught about a battery of an electric bicycle. An authorization can occur, for example, by entry of a predetermined code at a human-machine interface of the motor vehicle. It is also possible to provide that the code can be entered via a mobile terminal coupled to the motor vehicle.

Alternatively, the motor vehicle be taught about a battery of an electric bicycle in that, when the electric bicycle is delivered, provided identification data of the battery, for example, an identification number, is entered in the motor vehicle. Here too, the entry can occur via a mobile terminal coupled to the motor vehicle.

Preferably, the identification data is generated during the production of the battery. Here, in a memory device of the battery, the data can be stored or it can be printed on paper in order to be presented to the purchaser at the time of the purchase of the battery or of the electric bicycle together with the battery.

The invention moreover relates to a battery and to a motor vehicle designed for such an inventive system.

Additional preferred embodiments result from the dependent claims.

In reference to the inventive method, preferred presented embodiments and their advantages apply accordingly, to the extent applicable, to the inventive system for charging an electric bicycle from the power supply of a motor vehicle.

BRIEF DESCRIPTION OF THE DRAWINGS

Below, embodiment examples of the present invention are now described in greater detail in reference to the appended drawings. The drawings show.

DETAILED DESCRIPTION

Figure 1:
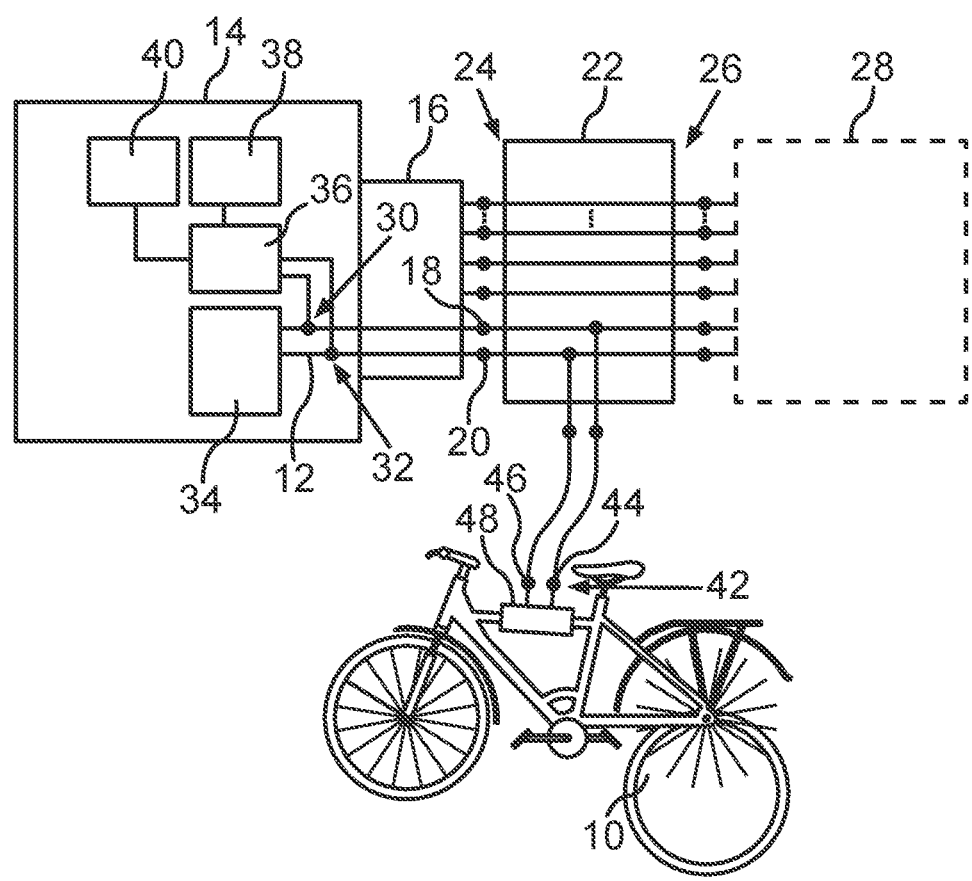
FIG. 1 a diagrammatic representation of an embodiment example of an inventive system for charging an electric bicycle from the power supply of a motor vehicle.

FIG. 1 shows, in a diagrammatic representation, an embodiment of an inventive system for charging an electric bicycle 10 from the power supply 12 of a motor vehicle 14. To the power supply 12 of the motor vehicle 14, an electrical trailer connection 16 is coupled, which can be designed, for example, as a 13-pin plug connector according to ISO11446. In each case, the electrical trailer connection 16 comprises a positive terminal 18 and a negative terminal 20. To the electrical trailer connection 16, an electrical adapter 22 is coupled, which, on the one hand, connects the terminals of the electrical trailer connection 16 from its input side 24 through to a first output side 26, in order to couple them to a trailer 28 represented with broken lines. On a second output side of the adapter 22, tappings are provided as connections to a positive line coupled to the positive terminal 18 and to a negative line coupled to the negative terminal 20.

The positive terminal 18 of the electrical trailer connection 16 is coupled to the positive terminal 30, and the negative terminal 20 of the electrical trailer connection 16 is coupled to the negative terminal 32 of a battery 34 of the motor vehicle 14. To the positive terminal and negative terminal 30, 32 of the battery 34, a communication device 36 is coupled. To this communication device, on the one hand, an evaluation device 38 and, on the other hand, an alarm system 40 of the motor vehicle 14 are coupled.

The electric bicycle 10 comprises a battery 48 with a charge connection 42 which comprises a positive terminal 44 and a negative terminal 46.

Figure 2:
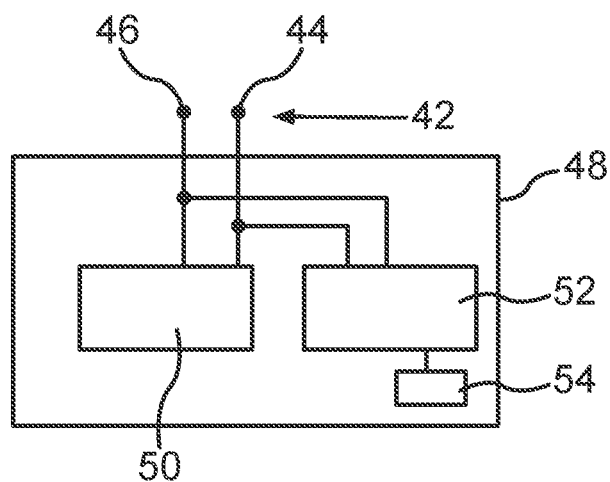
FIG. 2 a detailed representation of the battery of the electric bicycle of FIG. 1.

In reference to FIG. 2, the battery 48 of the electric bicycle 10 comprises a plurality of rechargeable storage cells 50, so-called secondary cells, which are coupled to the positive terminal 44 and to the negative terminal 46. Also, a communication device 52 is coupled to the plus terminal and the negative terminal 44, 46, to which communication device in turn a memory device 54 is coupled.

Figure 3:
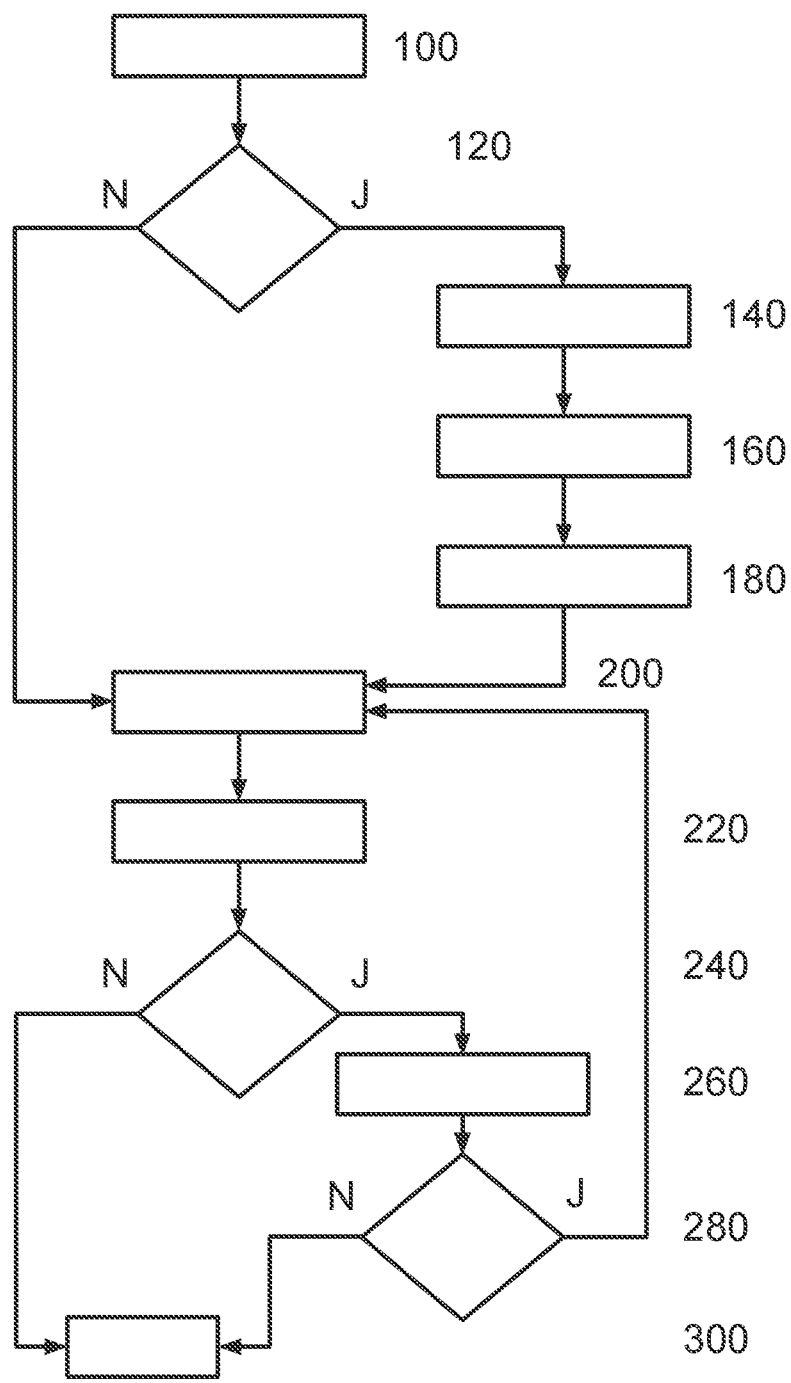
FIG. 3 a signal-flow graph for an embodiment example of an inventive method for charging an electric bicycle from the power supply of a motor vehicle.

In FIG. 3, an embodiment example of an inventive method for charging the electric bicycle 10 from the power supply 12 of the motor vehicle 14 is represented in a form of a signal-flow graph. In a preceding step which is not represented, identification data is stored in the storage device 54 during the production of the battery 48. By means of this identification data, the battery 48 is uniquely identified.

In step 100, it is determined that a battery 48 of an electric bicycle 10 has been coupled to the power supply 32 of the motor vehicle 14. In step 120, it is verified whether this is a first-time coupling of a battery 48 of an electric bicycle 10 to the power supply 12 of the motor vehicle 14. If this is the case, then the method is continued in step 200. If this is not the case, then in step 140 an authorization for coupling the battery 48 to the power supply 12 of the motor vehicle 14 is requested. For this purpose, for example, a user must enter a certain code at a human-machine interface of the motor vehicle 14.

If in step 140, a successful authorization has taken place, then, in step 160, identification data of the battery 48 is read out of the memory device 54 of the battery 48 and transmitted in an encrypted manner to the motor vehicle 14. This can occur via the positive line which couples the positive terminal 44 of the battery 48 to the positive terminal 18 of the electrical trailer connection 16. However, the charge connection 42 of the battery 48 can have a control terminal which is coupled to a corresponding control terminal of the electrical trailer connection 16, so that the transmission occurs via a control line connecting these two control terminals. Alternatively, the transmission can occur via wireless near-field communication between the battery 48 and the motor vehicle 14.

In step 180, the identification data transmitted in step 160 is stored as reference data in a memory device which can be arranged in the evaluation device 38 of the motor vehicle 14. However, it is also possible to store the identification data on a back-end server outside of the motor vehicle 14, to which the motor vehicle 14 has access. In step 200, the motor vehicle 14 sends via a communication channel a query signal concerning the identification data of the battery 48 to the battery 48. In subsequent step 220, the motor vehicle 14 listens in on the communication channel upon transmission of the identification data of the battery 48. In step 240, a verification is conducted to determine whether identification data has been received. If this is not the case, the method is continued in step 300. If identification data is received, this data is compared in step 260 with the reference data stored in the memory device of the evaluation device 38 of the motor vehicle 14. If in step 280 it is detected that the identification data is correct, the method branches again to step 200. However, if it is detected that the identification data transmitted by the battery 48 does not agree with the stored reference data, the method is continued in step 300, in which, via an alarm device, an alarm signal is output. As alarm device, the horn of the motor vehicle can be actuated, for example, or a mobile terminal of the user of the motor vehicle or an external server device can be actuated in the case of a monitoring service. For this purpose, the communication device 36 of the motor vehicle 14 can be designed in order to independently dial at least one telephone number stored in the motor vehicle 14. In the motor vehicle 14, multiple telephone numbers can also be stored, which are dialed by the motor vehicle in the case of a reception of incorrect identification data or of no identification data.

The invention claimed is:

1. A method for charging an electric bicycle from a power supply of a motor vehicle, comprising:
   the motor vehicle, having the power supply and an electrical trailer connection coupled to the power supply, wherein the electrical trailer connection includes at least a positive terminal and a negative terminal;
   the electric bicycle, having a battery with a charge connection which includes at least a positive terminal and a negative terminal;
   an electrical adapter which, on the input side, is coupled to the electrical trailer connection of the motor vehicle and which includes an output connection which includes at least a positive terminal and a negative terminal, wherein the positive terminal of the output connection is coupled via the electrical adapter to the positive terminal of the electrical trailer connection of the motor vehicle and the negative terminal of the output connection is connected via the electrical adapter to the negative terminal of the electrical trailer connection; wherein,
   a) the motor vehicle sends the battery a query signal relating to identification data of the battery via a communication channel;
   b) the motor vehicle listens in on the communication channel upon transmission of the identification data of the battery;
   c) for the case in which the motor vehicle receives incorrect information data or no identification data from the battery, an alarm signal is output by an alarm system of the motor vehicle.

2. The method according to claim 1, wherein step c) includes the following sub-step c1):
   c1) if the motor vehicle receives identification data from the battery, this data is compared in the motor vehicle against reference data.

3. The method according to claim 1, wherein the identification data is transmitted in an encrypted manner on the communication channel from the battery to the motor vehicle.

4. The method according to claim 1, wherein as communication channel for a communication between the motor vehicle and the battery, in particular for the sending of the query signal from the motor vehicle to the battery and for the transmission of the identification data from the battery to the motor vehicle, at least one of the following transmission paths is used:
   a positive line which couples the positive terminal of the battery to the positive terminal of the electrical trailer connection;

a control line which couples a control terminal of the charge connection of the battery to a control terminal of the electrical trailer connection;

wireless near-field communication between the battery and the motor vehicle.

5. The method according to claim 1, wherein after detection of an electrical coupling of the electric bicycle to the power supply of the motor vehicle, the query signal of step a) is sent at predetermined time intervals.

6. The method according to claim 1, wherein the motor vehicle is designed to carry out the following steps:
   e) verification as to whether a coupling of the battery of the electric bicycle to the power supply of the motor vehicle is a first-time coupling of a battery of an electric bicycle to the power supply of the motor vehicle;
   f) if in step e) a first-time coupling is detected: request for an authorization for the coupling of the battery to the power supply of the motor vehicle;
   g) if in step f) a successful authorization has taken place: transmission of the identification data of the battery from a memory device of the battery to the motor vehicle; and
   h) storing of the identification data transmitted in step g) in a memory device of the motor vehicle as reference data.

7. The method according to claim 1, wherein during the production of the battery, the identification data is stored in a memory device of the battery.

8. A system for charging an electric bicycle from the power supply of a motor vehicle, comprising:
   the motor vehicle, having the power supply and an electrical trailer connection coupled to the power supply, wherein the electrical trailer connection includes at least a positive terminal and a negative terminal;
   the electric bicycle, having a battery with a charge connection which includes at least a positive terminal and a negative terminal;
   an electrical adapter which can be coupled, on the input side, to the electrical trailer connection of the motor vehicle and which includes at least a first output connection which includes a positive terminal and a negative terminal, wherein the positive terminal of the first output connection can be coupled via the electrical adapter to the positive terminal of the electrical trailer connection of the motor vehicle, and the negative terminal of the first output connection can be coupled via the electrical adapter to the negative terminal of the electrical trailer connection; wherein,
   the motor vehicle is designed to send the battery a query signal relating to identification data of the battery via a communication channel, to listen in on the communication channel upon transmission of the identification data of the battery; and, if the motor vehicle receives incorrect identification data or no identification data from the battery, to output an alarm signal by an alarm system of the motor vehicle.

* * * * *